United States Patent [19]
Arumainayagam et al.

[11] Patent Number: 5,659,599
[45] Date of Patent: Aug. 19, 1997

[54] VOICE MAIL NETWORK AND NETWORKING METHOD

[75] Inventors: Allen Theivendran Arumainayagam, Malden; Robert Flagg Penfield, Maynard; Stephen Gerard Reppucci, Haverhill, all of Mass.

[73] Assignee: Boston Technology, Inc., Wakefield, Mass.

[21] Appl. No.: 333,993

[22] Filed: Nov. 2, 1994

Related U.S. Application Data

[63] Continuation of Ser. No. 871,417, Apr. 21, 1992, abandoned.
[51] Int. Cl.⁶ .................................................. H04M 1/64
[52] U.S. Cl. .......................... 379/89; 379/142; 379/207; 379/93.14
[58] Field of Search ........................ 379/67, 88, 89, 379/94, 207, 269, 142

[56] References Cited

U.S. PATENT DOCUMENTS

| | | | |
|---|---|---|---|
| 4,585,906 | 4/1986 | Matthews | 379/88 |
| 4,602,129 | 7/1986 | Matthews | 379/88 |
| 4,640,991 | 2/1987 | Matthews | 379/84 |
| 4,790,003 | 12/1988 | Kepley et al. | 379/142 |
| 4,933,967 | 6/1990 | Lo et al. | 379/94 |
| 5,029,199 | 7/1991 | Jones et al. | 379/89 |
| 5,193,110 | 3/1993 | Jones et al. | 379/89 |
| 5,255,314 | 10/1993 | Applegate et al. | 379/88 |

OTHER PUBLICATIONS

ACCESSNet Administration 801-1301-00 Issue 1, Oct. 1989.

*Primary Examiner*—Fan Tsang

[57] ABSTRACT

A system and method that implements a network of voice mail systems using a telephone network. Each node of the network queues voice messages to be sent to remote locations in a voice mailbox created for that remote location until a scheduled time for sending messages to that remote location. When the messages are sent, conventional telephone lines of the telephone network are used by dialing through the public telephone network to establish a node to node connection. When the connection is established, the messages in the queue are transferred over the telephone network in either analog or digital form. Multiple message processors in each node can allow multiple connections and simultaneous transmission and receipt of messages between nodes.

3 Claims, 4 Drawing Sheets

5,659,599

VOICE MAIL NETWORK AND NETWORKING METHOD

This application is a continuation of application Ser. No. 07/871,417, filed Apr. 21, 1992, now abandoned.

REFERENCE TO MICROFICHE APPENDIX

A source code appendix, submitted with this application, is incorporated by reference herein and has 5 fiche and 458 total frames.

CROSS REFERENCE TO RELATED APPLICATION

This application is related to U.S. application Ser. No. 07/871,770 entitled Multi-System Network Addressing by Arumainayagam, et al. and incorporated by reference herein.

BACKGROUND OF THE INVENTION

1. Field of the Invention

The present invention is directed to a network of message processing systems and, more particularly, to a network for voice mail processing systems capable of connecting such systems throughout the world without using dedicated lines.

2. Description of the Related Art

In recent years, telephone companies, particularly in North America, have begun providing a number of information services to subscribers. A common service (a data processing service) is to store and forward voice mail messages. Examples of voice mail systems which enable public telephone companies to provide voice mail services are disclosed in U.S. Pat. Nos. 4,371,752; 4,580,012; 4,581,486; 4,585,906; and 4,602,129. Other systems, including the capability of storing other types of messages such as E-mail and facsimile are described in U.S. Pat. Nos. 5,029,199; 5,193,110; and 5,263,080 which are assigned to Boston Technology, Inc. and are incorporated herein by reference. These systems are connected to a central office of a local telephone company or to a private branch exchange or other system handling calls for a large number of telephones. When one of the telephones serviced by the central office or other system is not answered, the calling party is given an opportunity to leave a telephone message which is stored for later reproduction by the user of the called telephone. The voice mailbox owner is given the ability to reproduce, store or dispose of the message. One of the ways in which a message may be disposed or reproduced is to forward the message to another user.

Several of these systems may be connected at various nodes (central office exchanges) in a telephone network. The nodes may all be within a single local telephone company, or in several different local telephone companies, such as those within one or more of the regional Bell companies. At the present time, a user may send a message to another user on the same data processing system, i.e., at the same node, but no method currently exists for easily transferring messages from a user on one data processing system to a user having a voice mailbox on another data processing system at a different node of the telephone system.

This node forwarding or sending limitation creates significant problems for users which are spread out over geographically diverse areas. For example, a large company may have offices in different cities in different area codes and possibly served by different regional telephone companies. As a result, the various offices of the company are served by different voice mail systems. A company employee, using the currently available systems, cannot forward a message to another employee whose voice mailbox is in another system. What is needed is a system which will integrate diverse types of such data processing systems that are located in diverse geographic locations.

SUMMARY OF THE INVENTION

It is an object of the present invention to provide a system that networks message storage systems such as voice mail systems.

It is another object of the present invention to provide a system that does not require dedicated connections between network nodes (voice mail systems) and uses telephone lines only when messages are transmitted between nodes.

It is another object of the present invention to provide a system that allows companies at separate physical locations to have an integrated voice mail network.

It is also an object of the present invention to provide a system that can be reconfigured easily and quickly.

It is a further object of the present invention to provide a network that allows multiple messages to be sent simultaneously between the connected systems as well as simultaneous connections between multiple systems.

It is an object of the present invention to provide a network that provides flexible routing for sent messages, choosing a public carrier such as AT&T or Sprint, a private network or dedicated lines for message routing.

It is another object of the present invention to provide network nodes with configurable access passwords.

It is also an object of the present invention to allow messages to be prioritized with separate message transport scheduling criteria.

It is another object of the present invention to optimize cost reduction by grouping messages to be sent to the same location and sending those messages in the same call or session.

It is a further object of the present invention to propagate the name announcement of often called mailboxes to remote systems to provide the appropriate mailbox name greeting at remote locations.

It is a further object of the present invention to return undelivered messages to the sender and provide return receipt request verification when desired.

It is a further object of the present invention to time stamp messages from remote locations so that the mailbox owner will know when the remote messages were delivered.

The above objects can be attained by a system and method that implements a voice mail network of voice mail systems using the public telephone network. Each node of the voice mail network queues messages to be sent to remote locations until a set of delivery criteria are met for sending messages to that remote location. When the messages are sent, conventional telephone lines are used by dialing through the public telephone network to establish a node to node connection. When the connection is established, the messages in the queue are transferred over the telephone network. Multiple message processors in each node allow multiple connections and simultaneous transmission and receipt of messages between remote nodes.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The networking system of the present invention provides the ability to exchange voice messages between voice mail (VM) systems using analog or digital techniques although analog is currently preferred because segments of the U.S. telephone network do not yet have digital transport capability. The invention allows service providers to supply voice messaging services to private businesses, corporations, or government agencies whose users' mailboxes reside on multiple VM systems due to multiple geographic locations. The invention may also be used for networking co-located systems as well as remote messaging for both intra local access and transport area (intra-LATA) and inter-LATA traffic.

The invention allows two or more VM systems to be networked together over regular analog and digital telephone lines. The public telephone network (PSTN) 10, as illustrated in FIG. 1, private telephone networks 12 or dedicated lines 14 or any combination thereof may be used for transmitting messages between VM systems 10–30.

The present invention implements a store and forward system or method. A voice message is initially recorded and stored on one VM system, and is later transmitted to another VM system and deposited in the mailbox of the intended recipient. The originating system calls or telephones the destination system to deliver the message. Typically, multiple remote messages are transmitted in a single delivery session. The recipient mailbox is determined to be local or remote when the sender enters the mailbox number in the original transaction whether it be the user designating a message to be forwarded or the original message storage.

Subscribers on each VM system may send and receive messages over the network (10, 12, 14) with full copy, reply and return receipt ability, without having to know that the mailbox of the recipient or sender resides on another VM system.

Figure 1:
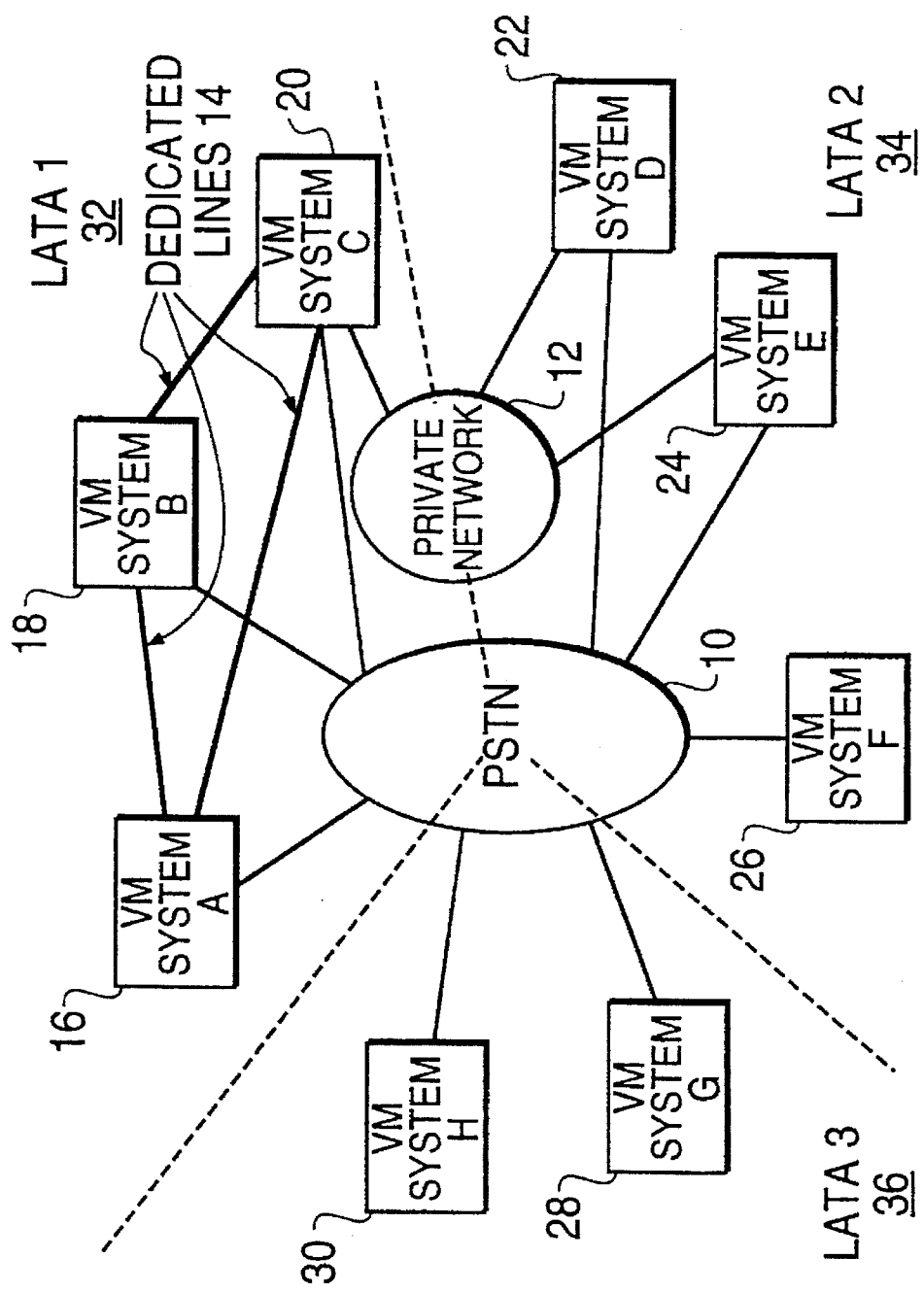
FIG. 1 illustrates a network in accordance with the present invention.

FIG. 1 illustrates a network of eight VM systems 16–30 that serve three LATAs 32, 34 and 36. The VM systems 16–30 can exchange voice messages via the public network (PSTN) 10 while system 20 can also communicate via the private network 12, e.g., using analog telephone lines, and the dedicated lines 14, e.g., digital telephone lines. VM systems 16, 18 and 20 can exchange messages (for all clients) using the dedicated lines 14 connecting them together. Systems 20, 24 and 22 are connected to the private telephone network 12 and all messages of the subscribers of these systems sent between the users (subscribers) within these three systems can be delivered via the private network 12 and messages to other companies can be delivered via the public network 10.

The present invention when used in conjunction with the teachings of the related Multi-System Network Addressing application previously mentioned provides flexible numbering plans. In the present invention, users address messages in the same manner as dialing the telephone number of the recipient. To the user, there is no difference in sending a message to a mailbox on the local system or a remote system. The present invention makes multiple VM systems appear to be one larger system to the end-user (subscriber).

Figure 2:
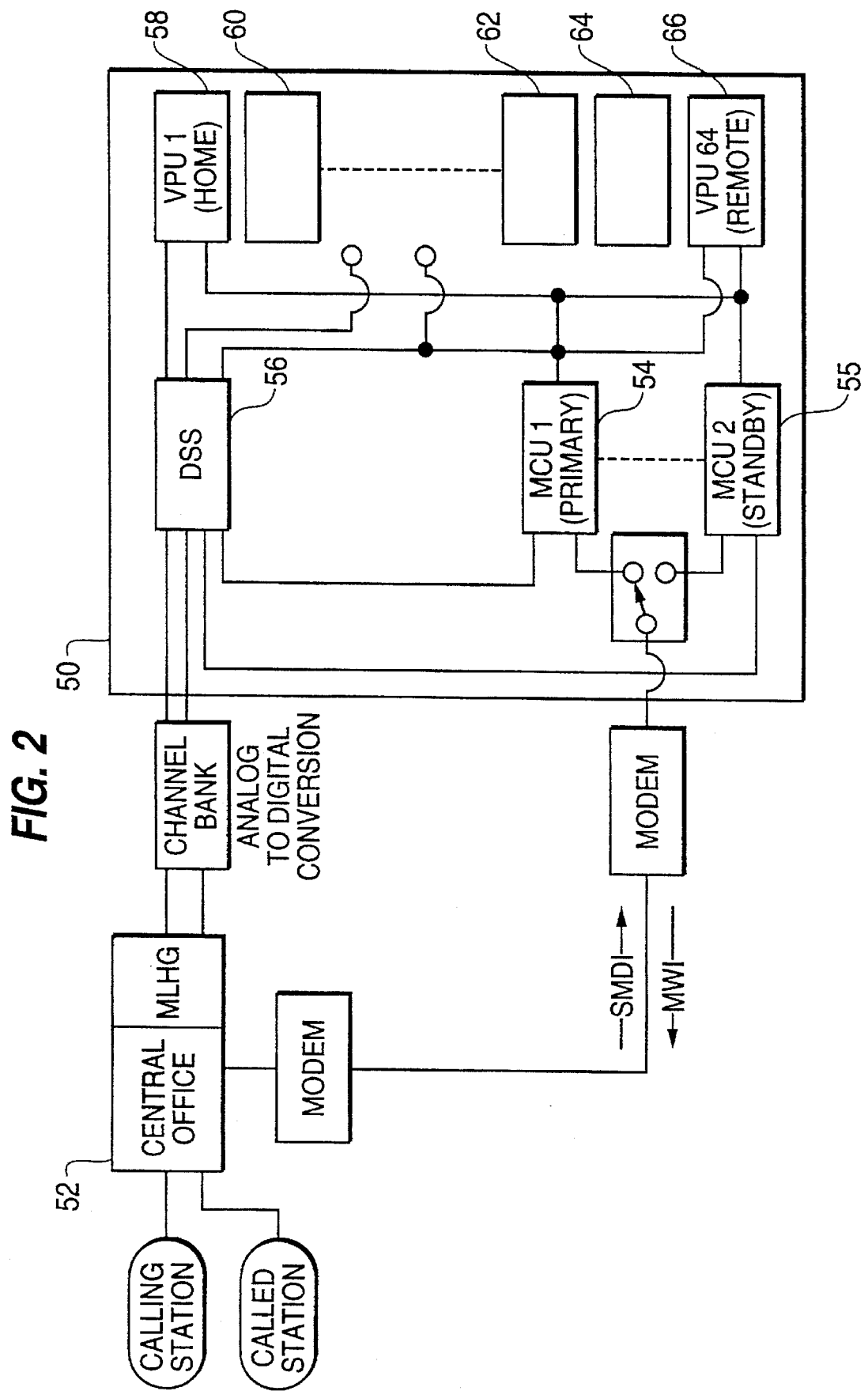
FIG. 2 is a block diagram of the components of one of the voice mail systems in the network of FIG. 1.

FIG. 2 illustrates the components of the preferred VM system 50 and the typical components which are used to connect the system 50 to a central switching office 52 of a public network 10 a private network 12 or dedicated lines 14. The system 50 includes master control units 54 and 56 which control the routing of telephone calls by a digital switching system 56. The digital switch 56 routes incoming telephone calls, such as telephone calls, from a remote system transferring a previously stored message, to voice processing units (VPUs) 58–66. The voice processing units 58–66 include the software, as will be discussed in more detail herein, which receives the message and stores the message in the appropriate mailbox. The MCUs 54 and 55 also route outgoing telephone calls in which a VPU sends a message to a remote VM system through the digital switching system 56 to the network 10. That is, the VPUs 58–66 and the MCUs 54 and 55 include the software, which will be discussed in more detail later, which sends the messages to the remote VM systems. The details of the preferred system 50 can be found in U.S. Pat. No. 5,029,199 previously mentioned and the system 50 along with appropriate software for locally storing and retrieving voice messages left by callers can be obtained from Boston Technology of Massachusetts as the COACCESS system.

Messages destined for remote systems are referenced in remote message queues. A remote message queue is similar to a voice message mailbox in that it holds file name references to messages. The remote message queue resides on the MCU 54 or 55 while the actual voice message resides in the VPU 58, 60, 62, 64 or 66 that originally took the call. The message references are stored temporarily in the queue until the messages are forwarded on to the destination system. Each queue is created as needed and the delivery criteria (including delivery schedule) are collected from the other configuration data.

Figure 3:
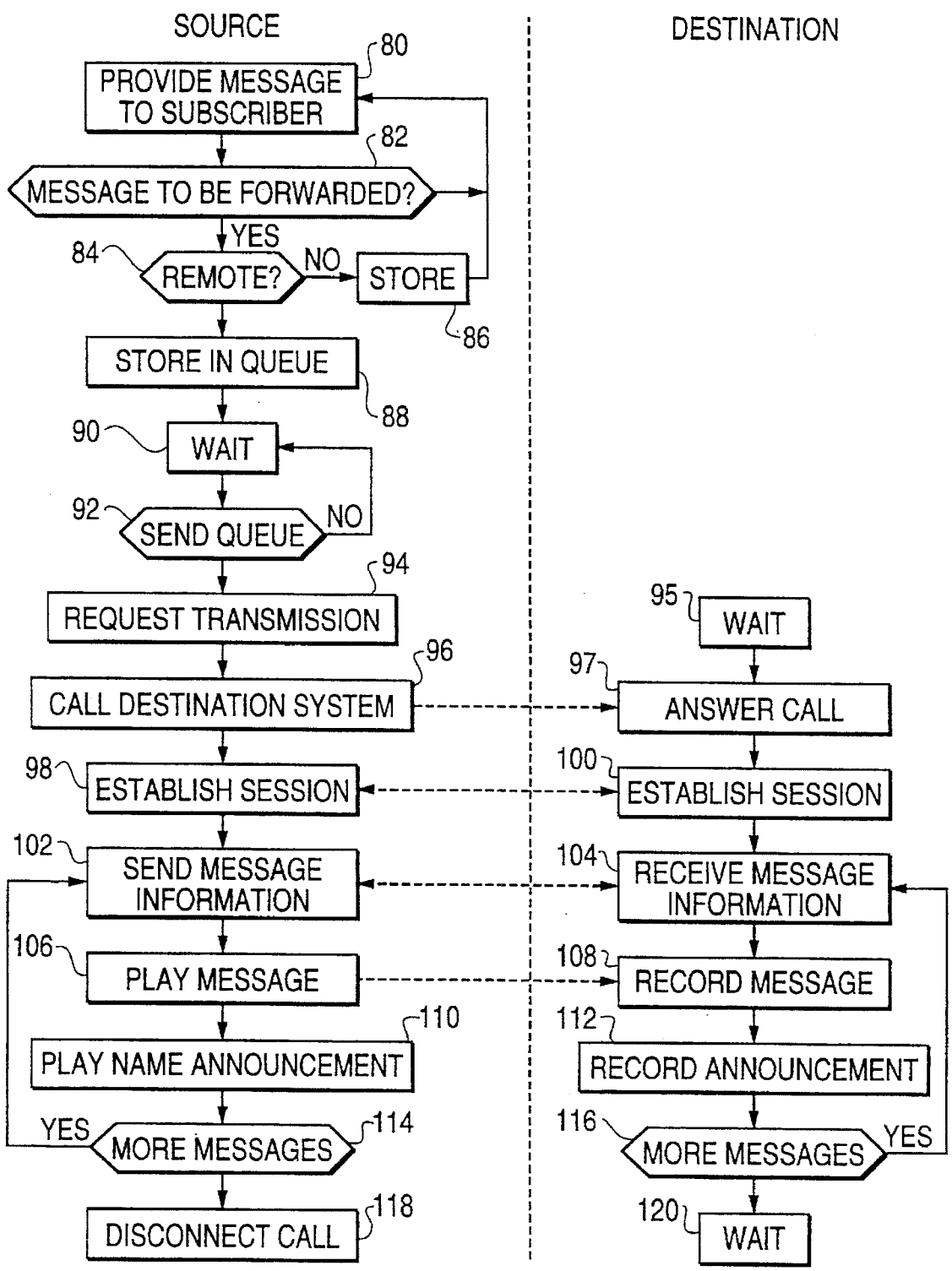
FIG. 3 is a flowchart of a method in accordance with the present invention.

As illustrated in FIG. 3, after a message is taken and recorded, the user reviews 80 the message and indicates whether it is to be forwarded, saved, deleted, etc. with the primary operation with respect to the present invention being designation for forwarding. When the voice mail application (process) determines 82 that the message is to be forwarded, the process also determines 84 whether the recipient of a message resides on a remote system. If not, the system stores 86 the message in the local mailbox. If so, the message is added 88 to the appropriate remote message queue on the local system. Rather than a stored message being forwarded on to another recipient it is also possible for the sender to record a message for delivery to a remote recipient. In such a situation once the message is recorded and the determination 84 is made, the message is added 88 to the queue. The queue is selected based on the destination host, carrier, class of service, and network account which describes the network configuration for a user, company or group of users.

The set of messages in the queue is delivered to the destination host based on the delivery schedule (standard and urgent) for the class of service associated with the queue. The schedule defines the message count, message length, and time delay thresholds based on specific time periods in the day. When it is determined 92 that the specified number of messages (count threshold), are in the queue, or the specified maximum messages length (total of all messages) is reached, or a message has been in the queue for a specified time (delay threshold), a delivery 94 is initiated. A unique delivery session identifier (ID) is generated for the delivery.

To perform a delivery an outdial request is made to select an outgoing trunk and VPU port on which a send facility will conduct the delivery session. The send facility is a part of the voicemail application process. The send facility performs the outdial call 96 to the destination system which answers 97 the call. The send facility on the originating host communicates with the receive facility on the destination host to deliver messages. A delivery session is established by validating 98 and 100 the password and host identifier (ID) of the destination system, and performing a line continuity check.

The first action taken to deliver a message is the transmission 102 and 104 of the message information (sender, recipient, urgent flag, etc.) to the destination system. If the message has multiple recipients, then the mailbox numbers of additional recipients are transmitted. The originating system then plays 106 the recorded message while the destination system records 108 the message over the telephone line. Next the name announcement of the sender is transmitted (played 110 and recorded 112).

Reply messages for non-delivery notification are generated on the destination system, however, they can be generated on the originating system. This includes non-delivery because the mailbox is invalid, does not exist, is disabled, or the message is longer than the destination system's limit. The destination host can provide non-delivery notification responses to the originating system during delivery 102 of the message information or more commonly the non-delivery message is returned during the next network session. Reply messages are also generated by the receiving system when the sender has requested return receipt and the receiver has accepted the sent message. This reply message is sent, in the next network transmission, to the sender of the original message. Once a message is delivered and received the systems check 114 and 116 to determine whether more messages are to be communicated. If so the next message is sent. If not the originator disconnects 118 the call and the recipient waits 120 for another delivery session.

There are situations where subsequent to the transmission of the message, the destination system will determine that the message cannot be delivered. This may happen if the recipient's mailbox is full (maximum messages have been stored or the maximum messages time has been exceeded) or has been disabled at the time that an attempt is made to deposit the message in the recipient's mailbox. In these cases a standard non-delivery notification reply is generated as a "return to sender" remote message which is sent back to the original sender by loading the message into the appropriate remote message queue on the destination system.

Each VM system maintains an imported names table as a file which references all remote mailbox name announcements which have been propagated to the local system. A copy of the name announcement of the sender, as discussed above, accompanies a message when it is delivered. The receive facility updates the table when a new name announcement is received from a remote host. Entries in the imported names table are marked with the date that the name announcement was delivered. An entry will "expire" and be deleted after a period of time unless it is updated with a new copy in a subsequent message delivery. The expiration checking operation should be performed each night. This serves to limit the amount of unneeded data on systems and minimizes the possibility of an obsolete name announcement being played to a user.

Remote messaging is transparent to the user such that the user does not necessarily know that the mailbox the user is sending to is on a different VM system. Users enter a mailbox number in a manner similar to dialing the telephone number of the recipient. For all functions (sending, forwarding, group messaging, etc), the user entered mailbox number (or numeric address) is translated into a mailbox/account name via the numbering plan associated with the current addressing domain. Message addressing is relative to the domain of the sender and is discussed in detail in the related Multi-System Network Addressing application previously mentioned.

As previously discussed the remote message queues are similar to mailboxes. A special database key is used to store the remote messages while they are awaiting delivery to the remote system. A unique key is generated for each combination of sender's network account, destination host id, carrier id, and class of service. It is, however, possible to send messages from one account with another account's messages in a single delivery session when a special generic network account is used to form the key.

Since remote message queues are created on an as needed basis, when a message is directed to a remote system, the queuing software checks to see if the appropriate queue for the specified combination of network account, destination host, class of service, and carrier exists. If not, the database objects that define the queue are created.

The system network configuration defines an expiration time for remote message queues. Whenever messages are removed from a queue, the last accessed time for the queue is updated. When there are no messages in a remote message queue for a period of time of, for example, seven days, the queue is deleted. This function is preferably run nightly during low usage periods.

The database keys used to access a remote message queue mailbox preferably have the following format $nnnnnnnnnnnccccchhhhhss Where:

| | |
|---|---|
| '$' | Is the ASCII value 0 × 24, used to ensure that this key is distinct from standard mailbox or account ids. |
| nnnnnnnnnn | Is the sender's network account id. |
| cccccc | Is the carrier being used. |
| hhhhhh | Is the destination host id. |
| ss | Is the encoded network class of service being used. |

The queuing process 88 involves receiving a remote message request and examining addressing and configuration data to determine the method of transmitting the message to the destination system. The message request contains a destination mailbox address, a destination host ID, and the network account name being used to send the message as well as the identification or file name of the actual message data. The host configuration data is examined to determine whether a custom carrier is defined between the two systems. If so, its specified carrier and class of service are used. Otherwise, the network account configuration data is examined to determine if a dedicated carrier entry exists for the destination host. If a dedicated carrier entry exists, the specified carrier and class of service descriptors are used. In the absence of either a dedicated carrier, or a custom host entry, the carrier and class of service defined for the network account are used.

By examining the location identifiers in the host configuration, the queuing process determines whether it can use the selected carrier (based on the carrier type specified in the carrier configuration). If it cannot use this carrier, it instead substitutes the default local carrier if such is specified for this network account.

A decision on whether to group messages from multiple clients to a specific destination in a single delivery session is made by performing a logical AND operation on a multiple accounts field of the selected carrier and a group with other accounts field of the class of service. Based on all of the preceding decisions, a remote message queue key is selected and the message data is added to that queue.

The scheduling process 92 involves examining a schedule defined for the class of service associated with a queue to determine if conditions warrant the initiation of an outdial session. This process is started whenever a message is deposited in a remote message queue, or when a delivery session is terminated (due to length of call/number of messages per call limitations).

To group multiple messages in a single delivery session, any outdial session pending for this mailbox is cancelled at the start of the scheduling process. The system network configuration and the selected class of service configuration for the queue are examined to determine the delivery criteria in effect for the current time period. The queue statistics (the number, type, and longest-waiting information for messages in the queue) are then compared to the delivery criteria to determine if an immediate outdial request should be initiated.

Since the request to cancel pending outdials may not be an acknowledged request in a particular implementation there exists the possibility of a race condition where an outdial request for service is dispatched just before the cancellation request is received. To minimize the effect of this race condition, the mechanism which services network outdial requests re-examines the scheduling criteria for the queue before initiating a remote delivery session. If queue parameters do not indicate that an outdial should take place, then the outdial request is ignored under the assumption that a previous session satisfied the queue delivery requirements.

If the message being added to the queue is an urgent message, then the delivery criteria for the urgent messages is checked first. If conditions warrant, an immediate outdial for delivery of the urgent message is issued. If not, or if the message being added is not an urgent message, then the delivery criteria for standard messages is checked. Again, if conditions warrant, an immediate outdial is issued, but for delivery of all messages in this case. If an immediate outdial is not performed for either case, then an outdial is scheduled for a future time, again in accordance with the delivery schedule and the number, type, and longest-waiting information on messages in the queue.

The transport process consists of dialing 96 the destination system, answering 97 and establishing 98 and 100 a delivery session by exchanging host IDs, host passwords, and version numbers. A protocol is then initiated in which each message is played on the originating system and recorded on the destination system. For each message, the queue is examined to determine if multiple recipients are scheduled to receive the message. If multiple recipients are found for any message, they are transmitted to the destination in such a way that only a single copy of the actual message is transmitted—the destination system ensures that all recipients receive the message by using a recipient list sent by the source. If a message being transmitted consists of multiple message segments (e.g. a redirected message) the various segments are treated as a single message—the segments are played sequentially by the originating host and recorded as a single entry on the destination host.

The performance of the present invention on the preferred platform described in U.S. Pat. No. 5,029,199 is affected by the volume of remote messages that it must handle. As contrasted to a standard (local) message delivery, the delivery of a remote message requires approximately ten additional database accesses to determine queuing and scheduling parameters. Additionally there exists the overhead of generating and servicing an outdial request and performing the message delivery protocol. To minimize the affect of these database accesses, all depositing (queuing) operations for remote messages with more than one recipient are performed by the MCU. This eases the drain on network bandwidth within the system caused by remote database accesses.

Figure 4:
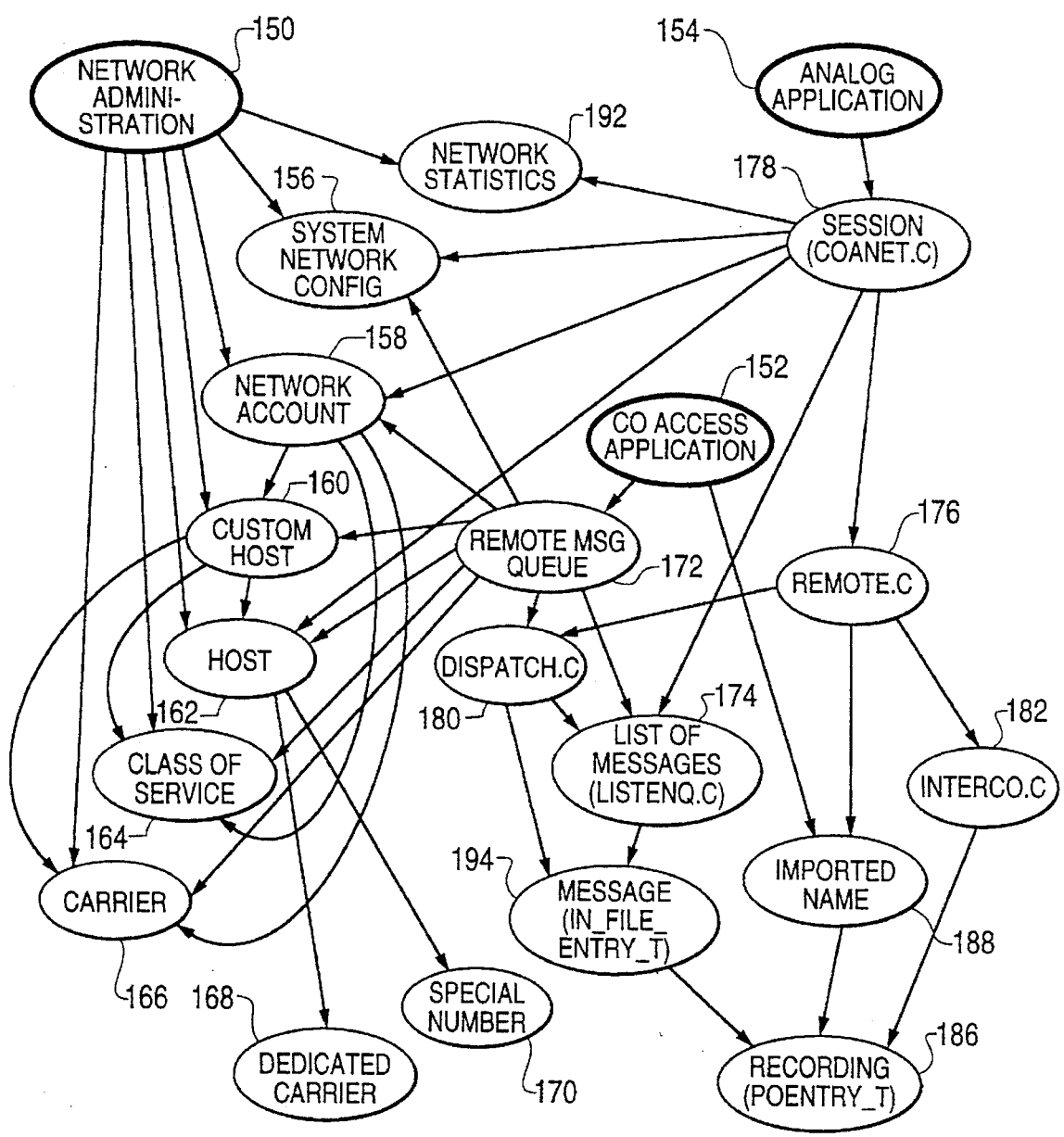
FIG. 4 is a module visibility diagram of object oriented software particularly described in the source code of the microfiche appendix that may be used to implement the present invention.

The present invention is preferably implemented in a language such as C using an operating system such as UNIX. FIG. 4 illustrates the object modules/databases of the present invention. The source code for the modules using the names of FIG. 4 can be found in the microfiche appendix.

The present invention provides the mechanism which transfers messages between different VM systems. Users address and record a message exactly as they would to send a message to a local user. The services of the present invention are invoked by an application such as a voice mail application when the application determines (via the addressing domains services described in the Multi-Systems Network Addressing application previously mentioned) that the message is directed to a user on a remote system. The invention delivers the message to the remote system, along with the associated message information (the sender, whether the message is marked urgent, etc.). The invention software consists of four major components. Network administration consists of a set of screens and processes which provide the ability to create, delete, and edit the entities that define the operation of the network. These entities include network accounts, network class of services, carrier configurations, host configurations, and system network configuration. Remote message queuing consists of the routines which perform the functions of storing messages in remote message queues prior to the actual transport to the remote host. Additionally, this component oversees the initiation of the message transport by examining the delivery parameters associated with each message queue. Message transport consists of the routines necessary to perform the actual delivery of messages between the two VM systems. Database access routines provide the mechanisms for storing and retrieving the configuration information and message data.

The approach preferably taken in implementing the present invention is in an object oriented design. In such a design the four major components can be broken into object modules, which contain both processes and data structures, as illustrated in FIG. 4. The network administration 150, CO ACCESS application 152, and analog application 154 modules are the coordinating components in the design. Network administration 150 is the administration program which provides the ability to maintain the network configuration data. CO ACCESS Application 152 is any process running on the VM system which has the ability to generate and address a remote voice message. Analog Application 154 is the portion of the voicemail process that performs the actual outdial and delivery of the message on the originating system, as well as that portion on the destination system which receives the message. Each of the other "bubbles" in the diagram is a module which represents an object and all of the operations (functions) that are performed on the object. The system network configuration 156, network account 158, custom host 160, host 162, class of service 164, and carrier 166 modules are the component objects of the network configuration data. Each module provides facilities to create, access, and update its respective configuration data. The dedicated carrier 168 and special number 170 modules provide the mechanisms for maintaining the tables of dedicated carrier entries and special phone number entries, respectively, for a host configuration. The remote message queue module 172 provides the facilities for adding messages to a queue destined for a remote system. Also included in this component 172 are the mechanisms for scheduling when and how the message delivery session is initiated and functions to return the number, type, and time-waiting statistics for the messages in the queue. This module also generates a unique id for each remote message. The list of messages module 174 provides facilities for adding and removing messages from the message queue. The remote module 176 provides the portion of the transport mechanism that handles the sending and receiving of messages, name announcements and message information (sender, time stamp, list of recipients, etc.). The session module 178 represents the main routine of the transport portion of the invention. This component coordinates the connection of the two systems and the exchange of messages and their associated data. The dispatch module 180 provides the facility for depositing messages in the list of messages for a mailbox or a remote message queue and detecting whether the message is addressed to a remote mailbox and perform the scheduling of the out-dial operation. The interco module 182 is the portion of the transport mechanism that interacts with voice driver routines to generate and interpret DTMF commands between originating and destination systems. This module 182 also understands that the call is a network message delivery call rather than a subscriber calling. The message module 184 represents a message and the recording module 186 represents a voice recording stored in a file. The imported name module 188 provides facilities for maintaining the database of name announcements received from remote systems. Functions to add, delete, access, and update name announcement entries are provided.

The objects or modules of FIG. 4 as described above and found in the appendix are preferably executed in the MCU or VPUs or shared between the MCU and VPUs as commonly accessible library type module or objects. The modules 150 and 192 preferably run only in the MCU, modules 152, 154, 176, 178, 182 and 186 preferably run only in the VPUs, module 180 runs in both the VPU and the MCU and objects 156, 158, 160, 162, 164, 166, 168, 170, 172, 174, 184 and 188 are shared by the MCU and VPUs.

The data structures used by the present invention are an extension of the directory-file-record database structure used by the preferred VM system and illustrated in FIG. 7 of the U.S. Pat. No. 5,029,199. Each file includes an identifier key list including identifier key fields which are conventionally searched for a match whenever particular information in the file is needed. Each key is associated with a record corresponding to the key and containing the needed information.

A network account file establishes the networking information for a client business or a group of users. A custom host file defines custom methods of accessing specific hosts when sending a message using that network account. Network account information is stored as identifier keyed records. An account identifier is a name of one to ten alphanumeric characters that uniquely identifies a network account. This value forms a portion of the database key used to store and retrieve the network account configuration data. The record corresponding to the key contains the information defining a single network account configuration. It specifies the account user's name, the billing code to use for messages sent from this account, the long distance carrier and class of service to use to send messages, and a boolean value to enable/disable the use of dedicated carriers. Also, this structure references a table of custom host entries to be used in conjunction with this account. The custom host table is a flat file containing the custom host entries for a network account. Each entry in the table defines the preferred method of sending messages to a specific host. It contains a host ID and the carrier ID and class of service to use in sending messages to that host.

A network class of service file defines a set of remote messaging parameters used by one or more network accounts, defines capabilities, options, and scheduling criteria for delivering messages to other systems and also defines configuration information. A scaler value identifier in a list of identifiers uniquely identifies a specific class of service entry. The valid range for this value is 1 through 3844. Each record corresponding to the identifier contains the information defining a class of service entry. It specifies whether or not to enable flat-rate billing, whether or not to group messages with those sent from other network accounts, and whether or not to propagate the sender's name announcement with messages. It also specifies the number of days to save imported name announcements on the local system without having a message sent from the corresponding mailbox. This structure also contains delivery scheduling parameters for urgent and standard messages in effect at a single time period. The delivery schedule defines the maximum number of messages, and the maximum length of time a message can be in the queue before a delivery is initiated. The maximum amount of total time of the messages in the queue before a delivery is initiated, the maximum amount of time allowed for a delivery session, the number of retries for failed delivery attempts, and the time interval to wait between retries.

A carrier configuration file defines information specific to a network through which remote messages are transmitted. This may define a long distance interexchange carrier, the local telephone company, a private telephone network, or dedicated lines between systems. A carrier entry contains an alphanumeric description of the carrier it describes, the carrier type, and the dialing prefix to use to access this carrier. It also specifies whether or not to allow grouping of messages sent from different network accounts. The key identifier for this file is a string of one to six printable ASCII (letter and digit) characters uniquely identifying a specific carrier entry.

A host configuration file contains information needed to establish a connection and deliver messages to a specific VM system host. The key identifier is a string of from one to six printable ASCII (letter and digit) characters uniquely identifying a specific host entry. The record contains the information defining a host entry. It contains an alphanumeric description of the host it describes, the name and phone number of the system administrator, and the host location identifier, password, and phone number. The file also contains a table specifying the dedicated carriers available to this host and a table of special phone numbers to use to access this host via specific carriers both pointed to by the pointers for the key. The dedicated carriers table is a file of dedicated carrier entries available to a network host. Each entry is a single dedicated carrier entry for a network host and contains the ID of the carrier it defines and the class of service to use when selecting this carrier. The special number table is a file of special phone number entries to use for a network host. Each entry is a single special phone number entry for a network host. It contains the ID of the carrier it defines, the phone number to dial to access the carrier from this host, and the connection file to use when dialing this host.

A system network configuration file defines information regarding system-wide parameters and limits for remote messaging. Each record contains the data for the system network configuration. It defines the host ID for this host, the carrier ID of the default local carrier, the maximum number of messages that are allowed to exist in any message queue before a delivery session is initiated, the maximum amount of time that any one message is allowed to exist in a message queue before a delivery session is initiated, the maximum length of a message delivery session, the maximum number of failed connection attempts to allow in delivering a message, the maximum number of messages per session, the maximum messages per queue, and the time interval to wait between connection retries. The record also defines whether or not to allow propagation of the sender's name announcement with messages and specifies the number of days to save imported name announcements from remote systems without having a message sent to the corresponding mailbox.

A remote message queue is a special mailbox used to hold messages while they are awaiting delivery to a remote host, the details of which have previously been discussed.

The imported name announcements file contains the imported name announcements attached to incoming messages. Announcements are created or updated whenever a message is received which contains an incoming name announcement. An announcement is removed from the database if it has not been referenced for an amount of time as specified in the system network configuration or network class of service configuration. Each record defines a single imported name announcement. Contains the sender's domain address, the time the message was last updated, and the identifier of the actual name announcement.

The object design of the present invention, the simultaneously executable modules and data structures described herein, the teachings of U.S. Pat. No. 5,029,199 and the teachings of the network addressing application previously discussed allows the present invention to provide a flexible numbering plan (a.k.a. dial plan) for message addressing. The flexible numbering plan allows users to address a mailbox in a manner similar to dialing the recipient's telephone number. These numbering plans can be universal across multiple VM systems (i.e. they cross system boundaries). Multiple overlapping numbering plans can also be provided and facilitate a mixture of private corporate network numbering plans (e.g. PBXs, ETN-type, or Centrex lines), standard addressing (including 10 digit numbering similar to NADP), and international numbering plans on the same system. Multiple networking trunks per VM system can be configured for shared incoming and outgoing, dedicated incoming, or dedicated outgoing calls. Multiple simultaneous sessions between two locations, depending on the network message traffic between two systems, can be set up by the system that is sending the messages. This will eliminate a backlog of messages quickly even though message transport is a slow process. Multiple connections to multiple locations allows a system to simultaneously conduct multiple incoming and outgoing message delivery sessions with multiple systems. This feature is limited by the number of trunks that are set up to perform networking. Each system has a configurable host password that the originating system must use to gain the access to the destination host. A flexible message delivery schedule is provided and configurable on a class of service basis. Scheduling criteria are defined based on time of day, maximum number of messages, maximum message length, and maximum delay (time between message being queued by the sender and being delivered). Messages are queued and delivered according to this schedule. A separate set of scheduling criteria can be set up for urgent messages to initiate the delivery of urgent messages as soon as they are sent. The system has the ability to make inter-LATA calls, using a preferred interexchange carrier chosen for the network account by the user. The system can group messages from multiple subscribers (or client businesses) by destination, class of service, and carrier, and deliver the messages in a single session.

The present invention provides feature transparency for remote messaging. For example, a sender hears the (remote) subscriber's name announcement if it is available on the local system. If the subscriber's name announcement is not available, then the sender will hear the dialed mailbox number. The name announcement of the sender accompanies remote messages and is stored on the remote system, so that the receiver may hear it for reply options. This imported name will also be available for users to hear when sending messages to the original sender. The name is updated the next time a message is sent by the user to the remote system. If the originating system is unable to deliver a message, a system voice error message, explaining the reason for delivery failure (attached to the original message), is deposited in the sender's mailbox. A message marked for return receipt requested triggers the system to send a reply (remote message) to the sender when the destination subscriber takes action on that message. The name announcement of the destination mailbox owner will accompany the return message. The time of the message that the recipient will hear is the time the message was deposited in the recipients mailbox.

Statistics can be collected to allow the system to track and report inbound and outbound network messaging usage. The statistics can detail the information regarding message delivery. The statistics contain such call statistics information as the message originator, the network account used, the applicable billing code, the delivery session ID, the message ID, any tie back session and message IDs, message type, completion code, connect duration, originating host, destination host and phone number, carrier ID used, and the date and time the message was sent. The statistics can also detail the amount of overhead associated with establishing the connection, and the amount of time spent attempting to re-transmit failed messages.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A message storage system network connected to a telephone network, comprising:

first, second and third message storage systems connected to the telephone network, each of said message storage systems comprising:
 a queuing system queuing messages to be transmitted; and
 a transmission system including
  means for coupling to at least two telephone lines among the digital telephone lines and the analog telephone lines in said telephone network, to establish at least one connection between said first message storage system and each of said second and third message storage systems after at least one message is queued in said first message storage system for each of said second and third message storage systems, and
  means for transmitting messages simultaneously to said second and third message storage systems.

2. A message storage system network, comprising:

a telephone network including analog and digital telephone lines; and first and second message storage systems connected to said telephone network, each of said message storage systems comprising:
 a queuing system queuing messages to be transmitted;
 a transmission system, including
  means for coupling to at least one of the digital telephone lines in said telephone network and at least one of the analog telephone lines in said telephone network,
  means to establish at least one connection between said first and second message storage systems after at least one message is queued in one of said first and second message storage systems, and
  means for sending a name announcement of a message sender with the at least one queued message between the first and second message storage systems via the at least one connection; and
 receiving means for storing the name announcement for future use related to the message sender until the name announcement has not been used for a longer period of time than a predetermined number of other name announcements received via said telephone network.

3. A voice message storage system network, comprising:

a telephone network; and first, second and third voice message storage systems connected to said telephone network, said first voice message storage system comprising:
 a digital switching system connected to said telephone network; and
 a computer connected to said digital switching system, said computer comprising:
  a queuing system queuing voice messages to be transmitted; and
  a transmission system capable of initiating establishment of at least six connections in said telephone network, using one of an analog telephone line connection and a digital telephone line connection for each, between said first, second and third voice message storage systems to provide for transmission from each of said first, second and third voice message storage systems to both of the others of said first, second and third voice message storage systems via different ones of said connections, establishing at least one of the at least six connections after at least two messages are queued and, responsive to predetermined scheduling criteria including time of day, a maximum number of queued messages, a maximum total message length for all queued messages, a maximum delay for each queued message and message priority of each queued message, simultaneously transmitting the at least two queued voice messages after at least two of the at least six connections are established, at least one to each of said second and third voice message storage systems from said first voice message storage system and sending a name announcement of a message sender with the at least two voice messages.

* * * * *